United States Patent
Dehlink et al.

(10) Patent No.: US 9,411,039 B2
(45) Date of Patent: Aug. 9, 2016

(54) PHASED-ARRAY RECEIVER, RADAR SYSTEM AND VEHICLE

(75) Inventors: Bernhard Dehlink, Munich (DE); Saverio Trotta, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 455 days.

(21) Appl. No.: 13/977,087

(22) PCT Filed: Jan. 21, 2011

(86) PCT No.: PCT/IB2011/050278
§ 371 (c)(1),
(2), (4) Date: Jun. 28, 2013

(87) PCT Pub. No.: WO2012/098437
PCT Pub. Date: Jul. 26, 2012

(65) Prior Publication Data
US 2013/0293411 A1    Nov. 7, 2013

(51) Int. Cl.
*G01S 7/03* (2006.01)
*G01S 3/04* (2006.01)
(Continued)

(52) U.S. Cl.
CPC . *G01S 7/03* (2013.01); *G01S 3/043* (2013.01); *G01S 7/032* (2013.01); *G01S 13/931* (2013.01);
(Continued)

(58) Field of Classification Search
CPC ........... G01S 3/043; G01S 7/03; G01S 7/032; G01S 13/34; G01S 13/93; G01S 13/931; G01S 2007/2886; G01S 2007/358; H01Q 3/26
USPC ................................................. 342/194, 350
See application file for complete search history.

(56) References Cited

U.S. PATENT DOCUMENTS 3,961,172 A * 6/1976 Hutcheon ............ G06G 7/1928
324/76.22
4,160,975 A * 7/1979 Steudel ..................... G01S 3/82
342/149
(Continued)

FOREIGN PATENT DOCUMENTS

CN           101273537 A    9/2008
EP            2594955 A1    5/2013
(Continued)

OTHER PUBLICATIONS

Erkens Holger et al: "A Low-Cost, High Resolution, 360o Phase/Gain Shifter in SiGe BiCMOS", IEEE, 2009, pp. 1-4.
(Continued)

Primary Examiner — Peter Bythrow
(74) Attorney, Agent, or Firm — Charlene R. Jacobsen

(57) ABSTRACT

A phased-array receiver comprises a plurality of analog beamforming receive channels, each comprising an antenna element arranged to receive a radio frequency signal and a channel output arranged to provide an analog channel output signal. At least one of the plurality of analog beamforming receive channels comprises an in-phase downconversion mixing circuit connected to the antenna element and a local oscillator source and arranged to provide a downconverted in-phase signal to a phase rotation circuit, and a quadrature downconversion mixing circuit connected to the antenna element and the local oscillator source and arranged to provide a downconverted quadrature signal to the phase rotation circuit. The phase rotation circuit is arranged to provide to the channel output a phase-shifted analog output signal generated from the downconverted in-phase signal and the downconverted quadrature signal.

20 Claims, 10 Drawing Sheets

(51) Int. Cl.
*G01S 13/93* (2006.01)
*G01S 13/34* (2006.01)
*G01S 7/288* (2006.01)
*G01S 7/35* (2006.01)
*H01Q 3/26* (2006.01)
*H01Q 1/32* (2006.01)

(52) U.S. Cl.
CPC ... *G01S 2007/2886* (2013.01); *G01S 2007/358* (2013.01); *H01Q 1/3233* (2013.01); *H01Q 3/26* (2013.01)

(56) References Cited

U.S. PATENT DOCUMENTS

| | | | | |
|---|---|---|---|---|
| 4,667,200 | A * | 5/1987 | Gellekink | H03D 1/22 342/194 |
| 4,717,916 | A * | 1/1988 | Adams | G01S 13/4454 342/107 |
| 4,760,398 | A * | 7/1988 | Norsworthy | G01S 13/536 342/114 |
| 4,806,934 | A * | 2/1989 | Magoon | G01S 13/586 327/231 |
| 4,989,008 | A | 1/1991 | Fujisaka et al. | |
| 5,121,364 | A * | 6/1992 | O'Donnell | G01S 7/52033 367/11 |
| 5,132,690 | A | 7/1992 | Martin | |
| 5,555,534 | A * | 9/1996 | Maslak | G01S 15/8979 367/135 |
| 6,029,116 | A * | 2/2000 | Wright | G01S 7/52023 702/32 |
| 6,121,917 | A * | 9/2000 | Yamada | G01S 13/345 342/104 |
| 6,337,656 | B1 * | 1/2002 | Natsume | G01S 13/44 342/149 |
| 6,441,783 | B1 * | 8/2002 | Dean | G01S 7/032 342/372 |
| 6,531,980 | B1 | 3/2003 | Jones | |
| 7,170,440 | B1 * | 1/2007 | Beckner | G01S 7/024 342/118 |
| 7,482,972 | B2 * | 1/2009 | Forstner | G01S 7/032 342/175 |
| 8,736,481 | B2 * | 5/2014 | Warke | H04L 27/0014 342/174 |
| 8,917,204 | B2 * | 12/2014 | Trotta | G01S 7/023 342/159 |
| 2005/0195103 | A1 | 9/2005 | Davis et al. | |
| 2006/0068707 | A1 * | 3/2006 | Greeley | H01Q 3/26 455/42 |
| 2006/0079784 | A1 * | 4/2006 | Shifrin | A61B 8/06 600/457 |
| 2007/0160168 | A1 * | 7/2007 | Beukema | H04L 27/0014 375/326 |
| 2008/0297414 | A1 | 12/2008 | Krishnaswamy et al. | |
| 2009/0251368 | A1 * | 10/2009 | McCune, Jr. | H01Q 3/38 342/368 |
| 2010/0013527 | A1 * | 1/2010 | Warnick | H03D 7/168 327/129 |
| 2012/0288033 | A1 * | 11/2012 | Stirling-Gallacher | G01S 7/03 375/322 |

FOREIGN PATENT DOCUMENTS

| | | |
|---|---|---|
| WO | 97/03367 | 1/1997 |
| WO | 2007075295 A2 | 7/2007 |
| WO | 2011001206 A1 | 1/2011 |

OTHER PUBLICATIONS

Jeon Sanggeun et al: "A Scalable 6-to-18 GHz Concurrent Dual-Band Quad-Beam Phased-Array Receiver in CMOS", IEEE Journal of Solid-State Circuits, vol. 43, No. 12, Dec. 2008, pp. 2660-2673.

Koh, Kwang-Jin et al: "An X- and Ku-Band 8-Element Phased-Array Receiver in 0.18-m SiGe BiCMOS Technology", IEEE Journal of Solid-State Circuits, vol. 43, No. 6, Jun. 2008, pp. 1360-1371.

Koh, Kwang-Jin et al: "A-Band Four-Element Phased-Array Front-End Receiver With Integrated Wilkinson Power Combiners in 0.18-lm SiGe BiCMOS Technology", IEEE Transactions on Microwave Theory and Techniques, vol. 56, No. 9, Sep. 2008, pp. 2046-2053.

Yu Tiku, et al: "A 22-24 GHz 4-Element CMOS Phased Array With On-Chip Coupling Characterization", IEEE Journal of Solid-State Circuits, vol. 43, No. 9, Sep. 2008, pp. 2134-2143.

International Search Report and Written Opinion correlating to PCT/IB2011/050278 dated Sep. 30, 2011.

Miura, A. et al., "S-Band Active Phased Array Antenna With Analog Phase Shifters Using Double-Balanced Mixers for Mobile SATCOM Vehicles", IEEE Transactions on Antennas and Propagation, vol. 53, Issue 8, Aug. 2005, pp. 2533-2541.

Jeon, S. et al., "A Novel Smart Antenna System Implementation for Broad-Band Wireless Communications", IEEE Transactions on Antennas and Propagation, vol. 50, Issue 5, May 2002, pp. 600-606.

* cited by examiner

PHASED-ARRAY RECEIVER, RADAR SYSTEM AND VEHICLE

FIELD OF THE INVENTION

This invention relates to a phased-array receiver, a radar system and a vehicle.

BACKGROUND OF THE INVENTION

A phased array or smart antenna is an electronically steerable directional antenna used for example in radar or in wireless communication systems. A phased array receiver contains a group or matrix of antenna elements and associated receive channel circuits in which the relative phases of received signals are varied in such a way that the effective reception pattern of the array is directed in a desired direction and suppressed in undesired directions. Beamforming is used in sensor arrays for directional signal transmission or reception. This spatial selectivity is achieved by using adaptive or fixed receive/transmit beam patterns.

A signal may be a time varying physical quantity carrying information, e.g. a varying voltage level, for example occurring at an antenna element when receiving an electromagnetic wave.

A phased-array receiver employing beamforming controls the phase and relative amplitude of the incoming signal received by each antenna element and combines the output signals delivered by receive channels associated with each antenna element in such a way that a particular radiation pattern can preferentially be observed. A phased-array receiver uses the phase difference of an incoming signal received at different antenna elements of an antenna matrix to determine the angular position of a target. Phased-array receivers are for example used in radar systems, where the bandwidth is a fraction of the centre frequency, and a time delay introduced by the spatial distance between receiving antenna elements can be mapped to a phase-shift between received signals. The spatial difference translates to a phase difference of the output signals of the receive channels, which may for example be downconverted signals, i.e. may have a frequency below the frequency of the received signal. This principle can be used to steer the antenna beam by introducing a phase-shift at the receive channels. This phase-shift can be realized using digital beamforming (DBF) in the digital domain, i.e. after sampling, or using analog beamforming (ABF) in the analog domain, i.e. prior to sampling.

Conversion of the incoming signal into a different frequency range may be achieved by means of a mixing circuit arranged to mix the incoming or received signal with a signal generated by a local oscillator circuit.

As shown in FIG. 1, a first prior art receive channel 100 of a first phased-array receiver can contain an antenna element 110 which delivers a radio frequency (RF) signal to a phase-shifter circuit 112 arranged to phase-shift the signal in the RF domain and provide it to mixer circuit 114 coupled to a local oscillator (LO) circuit 116. A generated output signal is delivered for analog or digital post-processing 118. Post-processing may include summing output signals delivered by multiple receive channel. Alternatively, as shown in FIG. 2, a second prior art phased-array receiver 200 has multiple receive channels, each containing an antenna element 210, 220, 224, which deliver radio frequency signals (RF1, RF2, RF3) to corresponding phase-shifter circuits 212, 222, 226 arranged to phase-shift the signals and provide them to a summation circuit 228 for power combining in the RF domain before provision to a mixer circuit 214 coupled to a local oscillator circuit 216. A generated output signal is then delivered for analog or digital post-processing 218.

In Koh et. al. "An X- and Ku-Band 8-Element Phased-Array Receiver in 0.18-µm SiGe BiCMOS Technology", IEEE Journal of Solid-State Circuits, Vol. 43, No. 6, June 2008, pp. 1360-1371, a phased-array receiver implemented using an all-RF architecture is shown, where the phase-shifting and power combining is carried out at the RF-level. Similarly, in Koh et. al. "A Q-Band Four-Element Phased-Array Front-End Receiver with Integrated Wilkinson Power Combiners in 0.18-µm SiGe BiCMOS Technology", IEEE Transactions on Microwave Theory and Techniques, Vol. 56, No. 9, September 2008, pp. 2046-2053, an all-RF architecture is shown, where phase-shifting is applied in the received signal path.

In Yu et al. "A 22-24 GHz 4-Element CMOS Phased Array With On-Chip Coupling Characterization"IEEE Journal of Solid-State Circuits, Vol. 43, No. 9, September 2008, pp. 2134-2143, the incoming signal is split into an in-phase (I) and a phase-shifted quadrature (Q) component. Generation of I and Q signals and summing is done in the RF signal path.

As shown in FIG. 3, a third prior art receive channel 300 of a third phased-array receiver can contain an antenna element 310 which delivers a radio frequency (RF) signal to mixer circuit 314. A generated output signal is delivered for analog or digital post-processing 318. Local oscillator circuit 316 is coupled to mixer circuit 314 through a phase-shifter circuit 312 arranged to phase-shift the local oscillator (LO) signal, i.e. phase-shifting may alternatively be performed not in the received signal path, but in the LO path before applying the LO signal to a mixer device for mixing with the received RF signal. In Jeon et al., "A Scalable 6-to-18 GHz Concurrent Dual-Band Quad-Beam Phased-Array Receiver in CMOS", IEEE Journal of Solid-State Circuits, Vol. 43, No. 12, December 2008, pp. 2660-2673, an integrated phased-array receiver is shown, wherein phase-shifting is performed in the local oscillator path.

Referring to FIG. 4, a prior art receive channel 400 is shown, wherein an antenna element 410 delivers a radio frequency (RF) signal to a power splitter circuit 412. In-phase (I) and quadrature (Q) signals are generated by mixing with a local oscillator 416 signal using directional coupler 418 and I- and Q-mixers 414, 424. I- and Q-signals are separately applied to dedicated analog-to-digital converters (ADC) 420, 422 for sampling the I- and Q-signals and subsequent digital processing. In PCT/US2006/046792, a linear FM radar system is presented, wherein two analog-to-digital conversion (ADC) circuits are used for sampling the output signals of an IQ-mixer.

As shown in FIG. 5, another prior art receive channel 500 of a phased-array receiver may contain a mixer circuit 514 for mixing received radio frequency (RF) signals received at antenna element 510 with local oscillator 516 signal in order to frequency-shift the received signal to a different frequency, for example an intermediate frequency (IF) below RF. The generated IF signal may then be split using an IQ generation module 518 into an in-phase signal 520 and a 90° phase-shifted quadrature signal 522 which may then be applied to a vector modulator or phase-shifter or phase rotator 512 and a weighting amplifier 524. In other words, the incoming RF signal is first downconverted into an IF signal, and IQ-generation and phase-shifting is applied afterwards in the IF domain.

In PCT/GB95/01607, a circuit module for a phased-array radar is shown, wherein superheterodyne, single-sideband receive channel modules with dedicated ADCs for each I- and Q-output are used. In Erkens et al., "A Low-Cost, High Resolution, 360° Phase/Gain Shifter in SiGe BiCMOS", IEEE 2009, polyphase filters are used for I- and Q-signal generation.

SUMMARY OF THE INVENTION

The present invention provides a phased-array receiver, a radar system and a vehicle as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated, for the understanding and appreciation of the underlying concepts of the present invention and in order not to obfuscate or distract from the teachings of the present invention.

Figure 1:
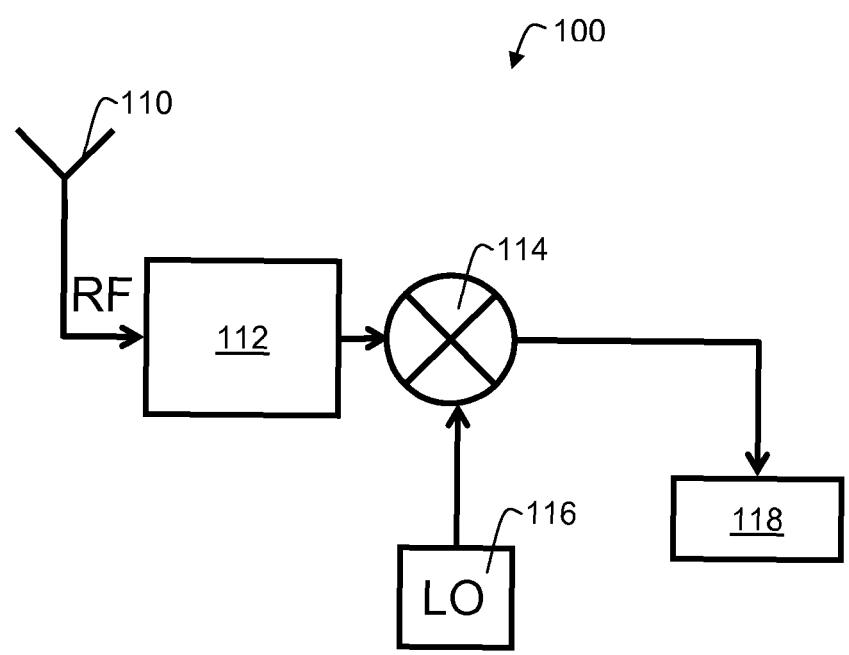
FIG. 1 schematically shows a block diagram of a first prior art receive channel of a first phased-array receiver.
Figure 2:
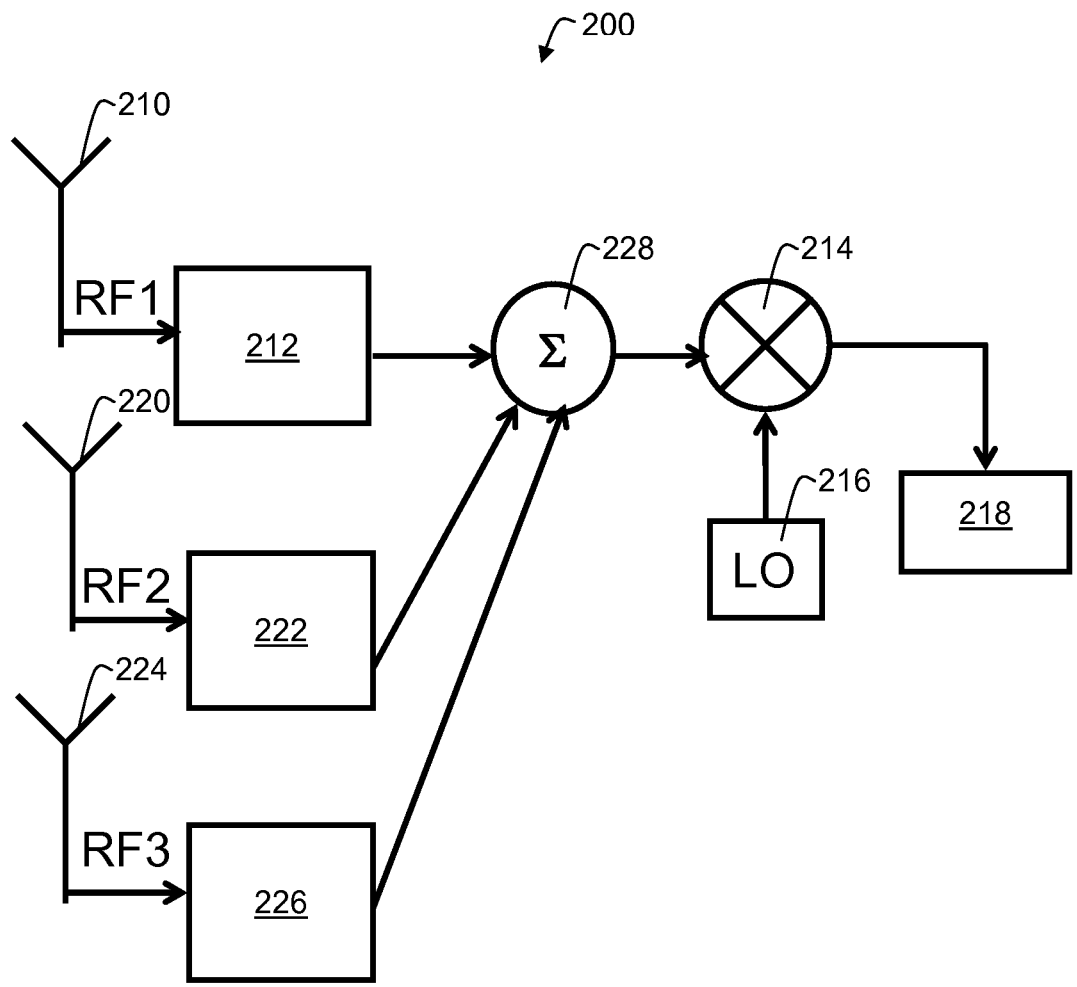
FIG. 2 schematically shows a block diagram of a second prior art phased-array receiver.
Figure 3:
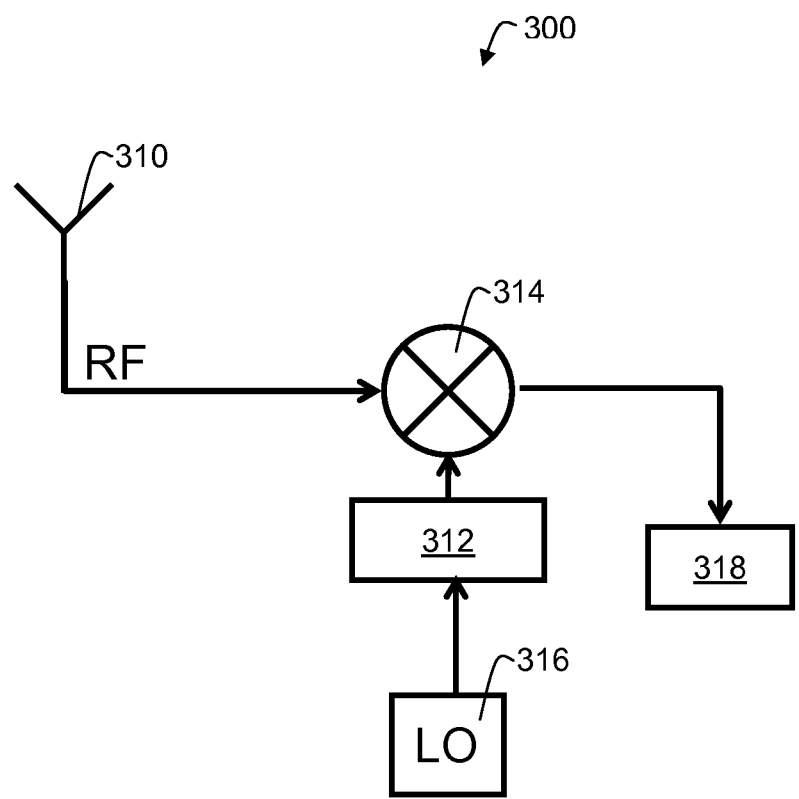
FIG. 3 schematically shows a block diagram of a third prior art receive channel of a third phased-array receiver FIG. 4 schematically shows a block diagram of a fourth prior art receive channel of a fourth phased-array receiver.
Figure 4:
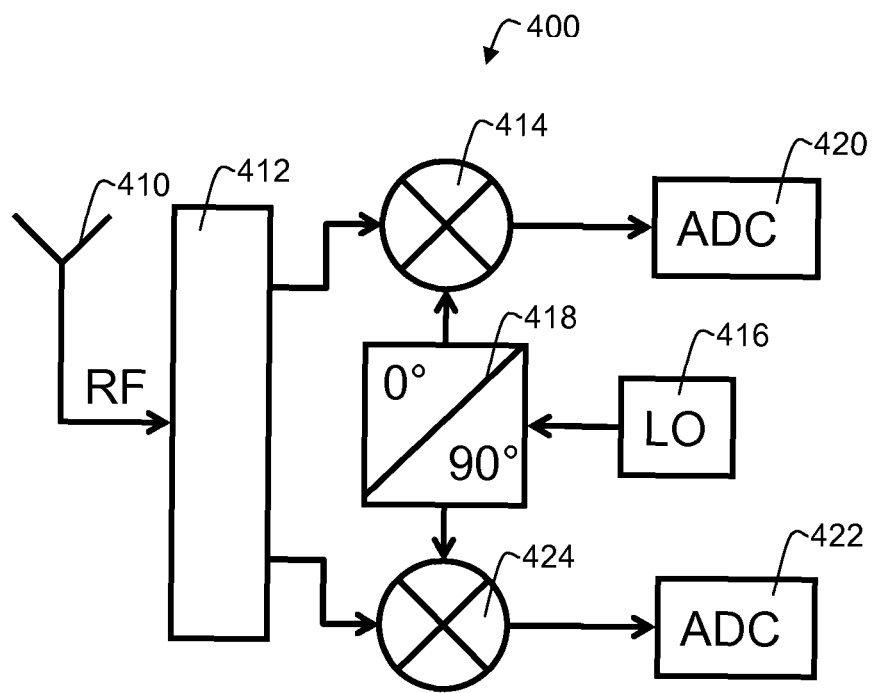
Figure 5:
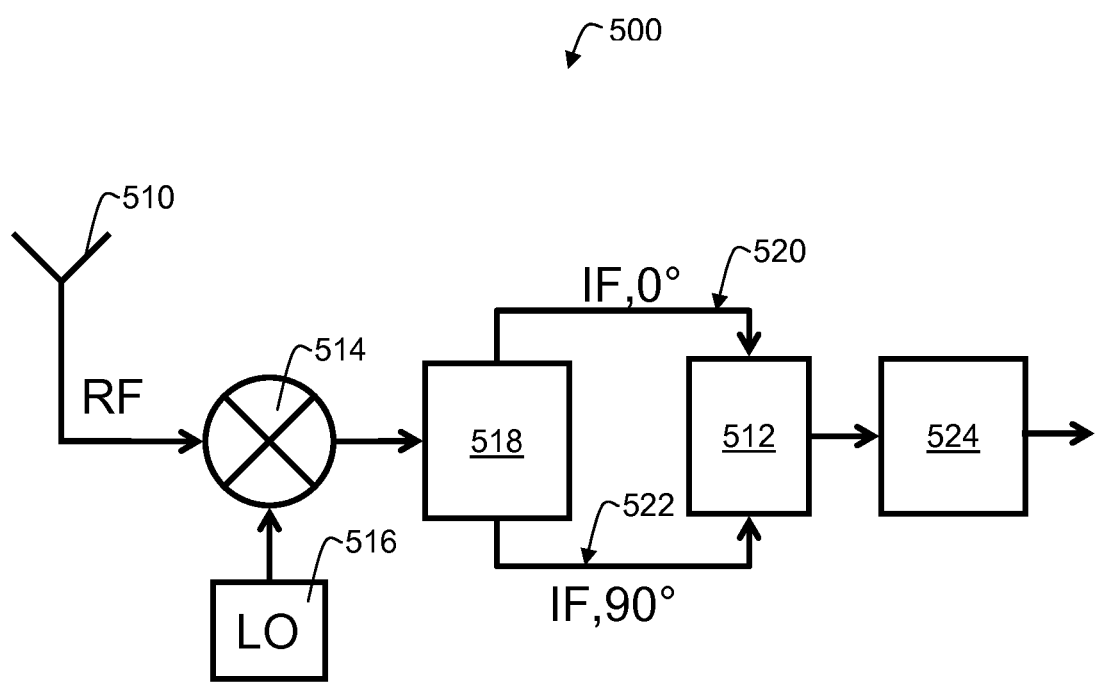
FIG. 5 schematically shows a block diagram of a fifth prior art receive channel of a fifth phased-array receiver.
Figure 6:
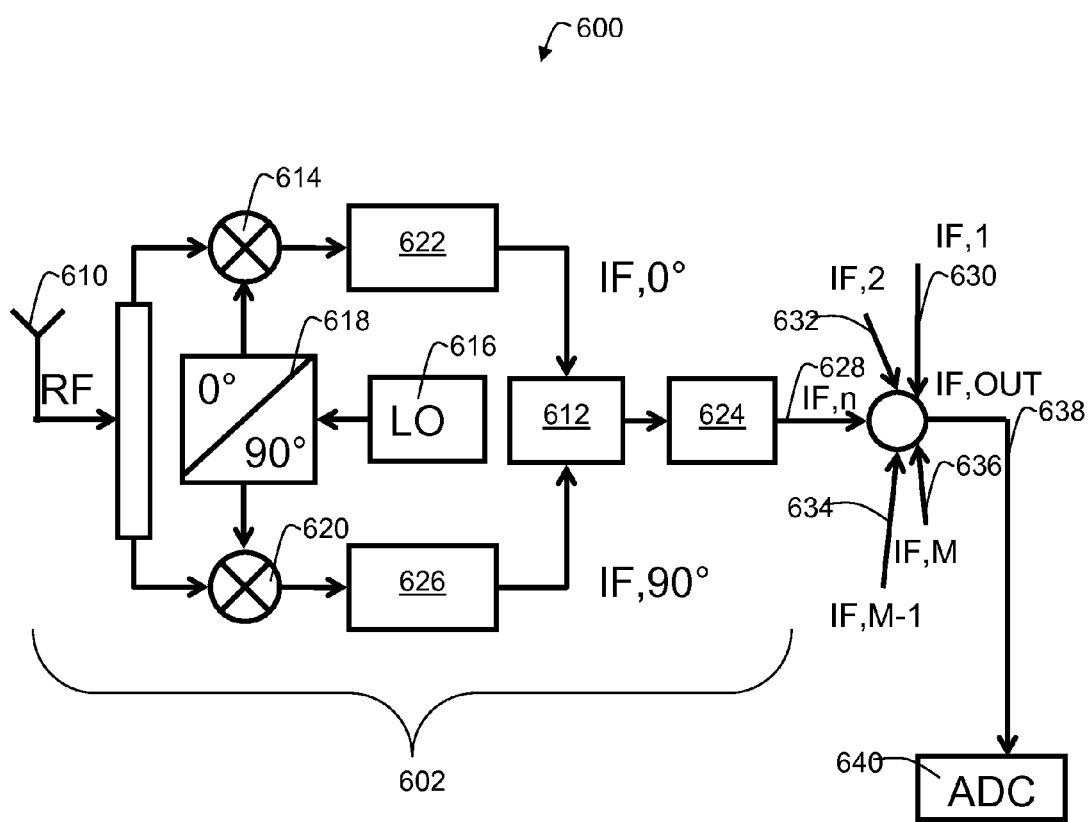
FIG. 6 schematically shows a block diagram of an example of a first embodiment of a receive channel of a phased-array receiver circuit.

Referring to FIG. 6, a block diagram of an example of a first embodiment of a receive channel of a phased-array receiver circuit is schematically shown. A phased-array receiver 600 comprises a plurality of analog beamforming receive channels 602, each comprising an antenna element 610 arranged to receive a radio frequency (RF) signal, and comprising a channel output 628 arranged to provide an analog channel output signal (IF,n). At least one of the analog beamforming receive channels comprises an in-phase downconversion mixing circuit 614 connected to the antenna element 610 and a local oscillator source 616 and arranged to provide a downconverted in-phase signal to a phase rotation circuit 612; and a quadrature downconversion mixing circuit 620 connected to the antenna element 610 and the local oscillator (LO) source 616 and arranged to provide a downconverted quadrature signal to the phase rotation circuit 612. The phase rotation circuit 612 is arranged to provide to the channel output 628 a phase-shifted analog output signal generated from the downconverted in-phase signal and the downconverted quadrature signal.

The shown receive channel may be an analog beamforming receive channel; no sampling of signals may be performed within the signal path between antenna element 610 and channel output 628. The phase rotation circuit or vector modulation circuit 612 may be arranged to introduce a defined phase-shift desired for beamforming of the reception pattern of the phased-array, to an output signal generated from combining in-phase- and quadrature signals. The phase rotator implementation may determine the precision of the system. Instead of applying phase-shifting in the LO path, the shown analog beamforming receive channel may apply phase-shifting in the IF signal path, i.e. after downconversion and I- and Q-signal generation, which may reduce channel gain dependence on the phase-setting, reduce required die area, power consumption and PVT variation, i.e. variation in power, voltage and temperature of the integrated circuit, and provide a large IF bandwidth, compared to prior art solutions.

The shown receive channel 602 may be considered an analog receive channel, even if control signal values, for example applied to the phase rotation circuit 612 for applying a desired phase-shift, may be provided sampled and quantized, which may be considered a digital representation.

The LO source 616 shown in FIG. 6 providing the LO signal may for example be the transmitting counterpart of a phased-array system. Or it may be implemented at the receiver as a single circuit generating one LO signal. In another embodiment, the LO signal applied to each mixer may be generated using separate LO circuits, for example generating LO signals of the same frequency. In yet another embodiment, the LO signal may be generated using an IQ oscillator, arranged to directly generate I- and Q-LO signals.

In-phase mixing circuit 614 and quadrature mixing circuit 620 may be downconversion mixing circuits, i.e. by mixing received RF signal with in-phase and 90° phase-shifted LO signal, I- and Q-mixer output signals may be converted into signals having a frequency below those of the received RF signal, which may be referred to as intermediate frequency (IF). During post-processing, this frequency may or may not be further reduced. It should be noted that the term "frequency" may not only refer to a single distinct frequency value, but to a spectrum of frequencies the particular signal may comprise.

At least one of the analog beamforming receive channels 602 may comprise a weighting amplifier circuit 624 or variable gain amplifier circuit connected to amplify the phase-shifted analog output signal before provision to the channel output 628. Weighting factors may be applied to the weighting amplifier circuit 624 through a control input (not shown), for example by a controller circuit. The weighting amplifier circuit 624 may be an amplitude weighting amplifier or variable gain amplifier (VGA) allowing for example suppression of signals from outer channels and putting larger weight on signals received at inner channels.

The phased-array receiver 600 may comprise a first summation circuit connected to the channel outputs 628, 630, 632, 634, 636 of the plurality of analog beamforming receive channels and arranged to provide an analog summation output signal 638. Receive channel output signals IF, 1, IF, 2, IF, m-1 and IF, m, where m represents the channel number, may be provided at channel outputs 630, 632, 634, 636. In FIG. 6, only one 602 of the plurality of analog beamforming receive channels of the phased-array circuit 600 is shown in detail. Other receive channels are indicated by their channel outputs 630, 632, 634, 636. The shown analog beamforming may allow summation of all receive channel output signals prior to processing, which may greatly reduce digital requirements. Only the summation output signal 638 (IF, OUT) may be converted into a digital representation, whereas phase rotation and weighting may be performed in the analog domain.

The phased-array receiver 600 may comprise one analog-digital conversion circuit 640 (ADC), the analog-digital conversion circuit 640 connected to receive the analog summation output signal and provide a digital summation output signal. Only one single ADC 640 may be used for a plurality or all of the receive channels, for example saving die area and reducing power consumption, memory, and digital signal processing requirements, compared to digital beamforming solutions. The shown embodiment may for example be suitable when a large number of receive channels is used. The number of ADCs may remain unchanged, one, since all phase-shifted and weighted signals may be summed in the analog domain. The shown embodiment may allow for low-cost ABF phased-array systems consisting of many receive channels (for example 4, 8, 16, 32 etc., each with high signal-to-noise ratio (SNR)), which may allow high angular resolution analog beamforming (ABF) systems, but require large die areas and become very expensive when using digital beamforming.

A large number of receive channels, for example 4, 8, 16, or 32, may be required to build a high-performance automotive radar system with precise angular resolution. Digital beamforming (DBF) solutions having one or two ADCs per receive channel are usually too expensive, power-hungry, and, from an integration standpoint, consume large die area. ABF solves this problem by steering the receive antenna beam with adjustable phase-shifts in each channel and summing the outputs of all channels to one output signal that is then fed to one ADC. This approach may for example allow building very cheap 77 GHz radar sensors.

Each receive channel may for example be attenuated or amplified using a weighting amplifier to yield a desired beam pattern.

At least one of the analog beamforming receive channel 602 of the phased-array receiver circuit 600 may comprise a power splitter circuit 642 connected between the antenna element 610 and the in-phase downconversion mixing circuit 614 and the quadrature downconversion mixing circuit 620. The power splitter circuit 642, or power divider circuit, may be arranged to split the received RF signal into a first and similar or identical second RF signal for provision to the in-phase and quadrature downconversion mixing circuits 614, 620.

At least one of the plurality of analog beamforming receive channels 602 may comprise one or more high-pass filter circuits 622, 626 arranged to high-pass filter the downconverted in-phase (I) signal and the downconverted quadrature (Q) signal before provision to the phase rotation circuit 612, which may help decoupling the phase rotator circuit 612 from any DC level introduced for example by the downconversion mixer circuits 614, 620. High-pass filtering the downconverted I- and Q-signals may protect the phase rotation circuit from overloading, i.e. from being driven into saturation, which may allow for very precise evaluation of the received signals. In another embodiment, high-pass filtering may be applied to only the in-phase or the quadrature signal.

The in-phase downconversion mixing circuit 614 and the quadrature downconversion mixing circuit 620 may be homodyne downconversion mixing circuits. Homodyne mixing circuits receive a LO-signal having a frequency corresponding to the frequency of the received (RF) signal, allowing for direct conversion of the received signal into an output signal, whereas for example a heterodyne mixing circuit may receive a LO signal having an intermediate frequency different from the RF signal frequency, requiring an additional conversion step before provision of an output signal having a target output frequency. And unlike all-pass filters or polyphase filters used in the IF domain, the shown in-phase downconversion mixing circuit 614 and the quadrature downconversion mixing circuit 620 may be arranged to deliver downconverted broadband signals, for example covering a frequency range of several decades. As an example, the radio frequency signal may be a radar signal, e.g. 77 GHz radar signals, for example used in automotive radar systems. The shown analog beamforming receive channel 602 may allow for provision of in-phase and quadrature signals covering several decades, for example 10 kHz up to 20 MHz, enabling broadband phase-shifting in the receive channel 602. The shown receive channel may allow IQ signal generation in the RF domain using homodyne mixing circuits 614, 620 which generate two signals 90° out of phase over a broad IF range, for example 10 kHz-20 MHz, suitable for automotive radar, and feed these signals to the phase rotation circuit 612 in the IF domain. The IF range of automotive radar beat signals may span over more than three decades, for example from 10 kHz up to 20 MHz.

Figure 7:
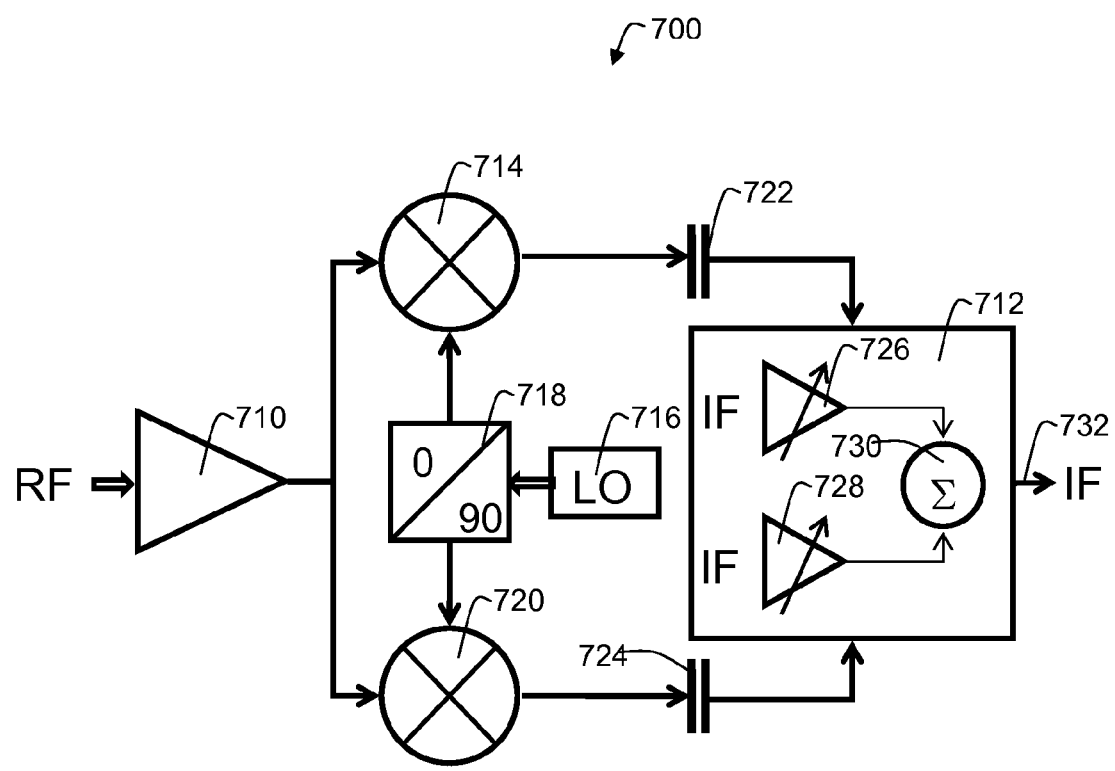
FIG. 7 schematically shows a block diagram of an example of a second embodiment of a receive channel of a phased-array receiver circuit.

Referring now to FIG. 7, a diagram of an example of a second embodiment of a receive channel 700 of a phased-array receiver circuit is schematically shown. An incoming RF signal may be amplified by amplifier circuit 710 and, after power splitting, provided to in-phase downconversion mixing circuit 714 and quadrature downconversion mixing circuit 720. I- and Q-signals may be provided to a phase rotation circuit 712 through high-pass filters 722, 724, which may for example be implemented as capacitive devices allowing for AC coupling. The phase rotation circuit 712 may comprise a plurality of controllable variable gain amplification devices 726, 728, and a second summation circuit 730.

The plurality of controllable variable gain amplification devices 726, 728 may be arranged to separately amplify the downconverted in-phase signal and the downconverted quadrature signal depending on parameter values provided by a controller device (not shown). The downconverted 90° out-of-phase I- and Q-signals may be amplified with different amplification factors and subsequently summed by summation circuit 730 in order to introduce an adjustable phase-shift to the output signal 732 of the shown receive channel 700.

Variable gain control may be applied to variable gain amplification devices 726, 728 by applying discrete parameter values for introducing a precisely selectable degree of phase-shift. In another embodiment, gain control may be realized using continuously changing parameter values.

The same variable-gain amplifier devices 726, 728 may be used for high-precision amplitude weighting of the output signal delivered by the channel.

The shown phase rotator circuit 712 may for example be provided as an integrated circuit or as part of an integrated circuit comprising the phased-array.

The at least one of the analog beamforming receive channels 602 may comprise a directional coupler circuit 718 connected to an output of the local oscillator source 716, and arranged to provide an in-phase local oscillator signal to the in-phase downconversion mixing circuit 714 and a quadrature local oscillator signal to the quadrature downconversion mixing circuit 720. A directional coupler may be a passive device, easy to integrate and may allow applying radio frequency LO signals.

The directional coupler may for example comprise a branchline coupler as a passive directional coupler, for example suitable when implemented using microstrip technology. The LO signal may be generated in the RF domain which may enable in-phase and quadrature signals over at least 10% of the LO center frequency in case of a passive branchline coupler.

In another embodiment of the phased-array receiver, the directional coupler 718 may comprise a frequency divider circuit. A local oscillator signal generated by the local oscillator source 716 may be provided to the frequency divider circuit using a frequency doubler circuit.

Figure 8:
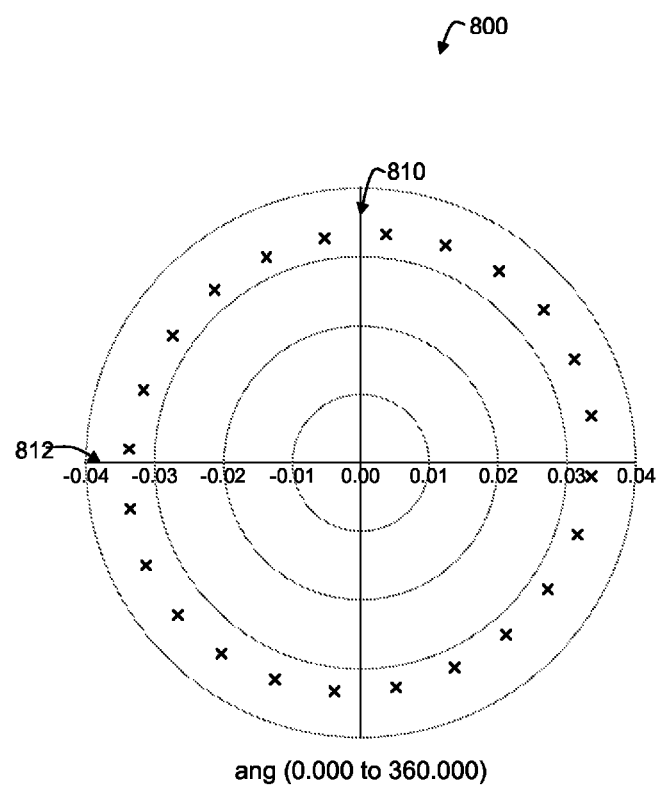
FIG. 8 schematically shows a diagram of a received signal level over an output signal level, for different degrees of phase-shift.
Figure 9:
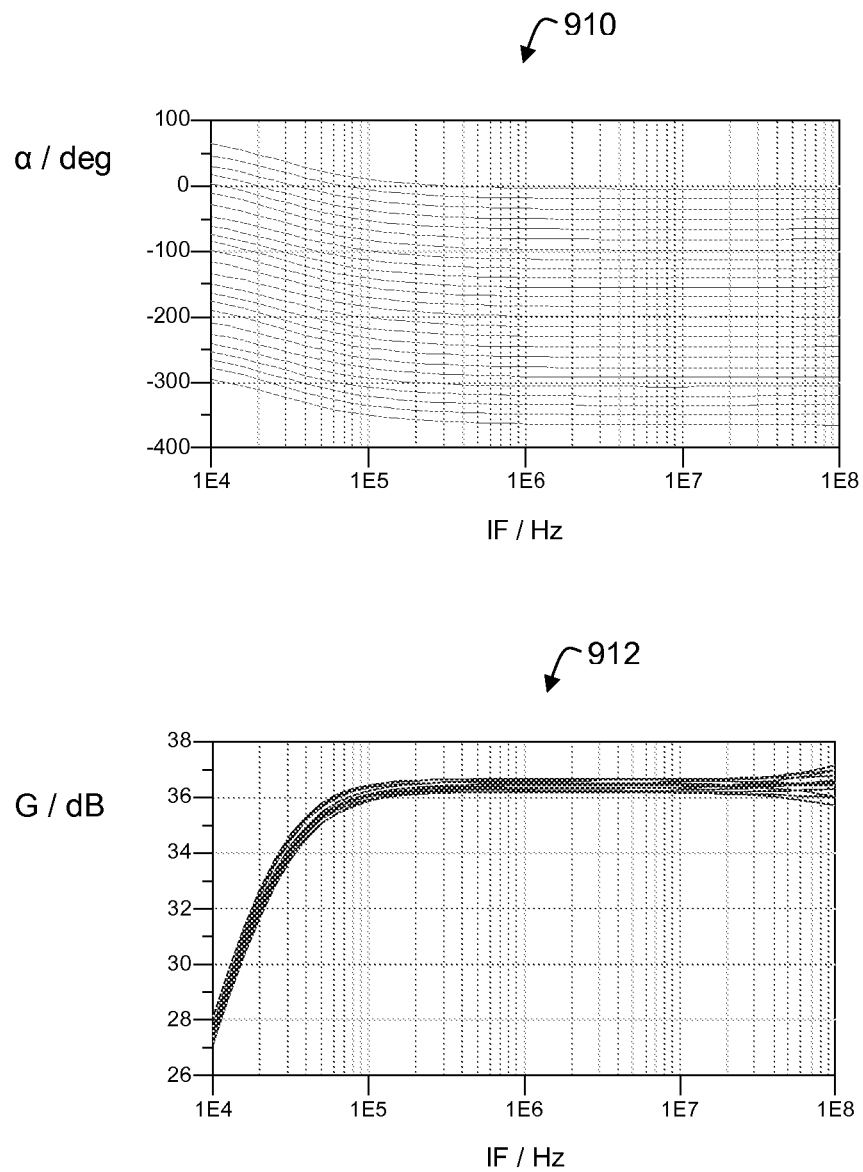
FIG. 9 schematically shows a diagram of an example of a transfer function of a phase rotator and of a receive channel of a phased-array receiver circuit.

Referring now to FIG. 8, a diagram 800 of an example of a received signal level 810 over an output signal level 812 (in Volts), for different degrees of phase-shift, is shown. In the shown example, phase-shift is applied in 15° steps (0° to 360°) to a phase rotator of an analog beamforming receive channel receiving an input signal at an IF of 1 MHz. Valid points in the diagram are indicated with an "x". Referring also to FIG. 9, a diagram of an example of a transfer function of a phase rotator 910 and of a receive channel of a phased-array receiver circuit 920 is shown. The transfer function of the phase rotator is given by a set of diagram lines spaced 15° from each other, with the absolute phase-shift α (deg) plotted over the frequency IF (Hz) of the downconverted signal. It can be seen that, for each phase-shift shown, the phase difference does not depend on the IF. Diagram 912 shows that the gain G (dB) of a receive channel may only very little depend on the chosen phase-shift setting.

Figure 10:
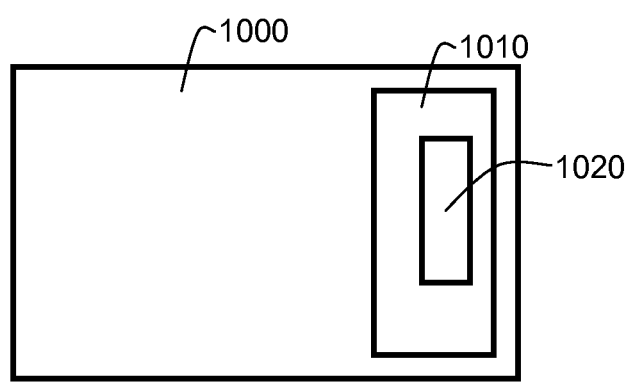
FIG. 10 schematically shows a block diagram of an example of an embodiment of a vehicle comprising a radar system with a phased-array receiver circuit.

Referring now to FIG. 10, a block diagram of an example of an embodiment of a vehicle comprising a radar system with a phased-array receiver circuit is schematically shown.

A radar system 1010 may comprise a phased-array receiver 1020 as described above. It may further comprise a sender for radiating radar signals. It should be noted that radar frequency range may be considered a subset of the radio frequency range. The radar system 1010 may be any radar system, for example an automotive radar system. The illustrated radar system may be a low-cost, high-performance automotive radar system with smart phase-shifting functionality implementation by combining broadband I- and Q-signal generation in the RF domain and the usage of the described analog phase rotator in the IF domain. In an embodiment, it may further comprise amplitude weighting in the IF domain.

A vehicle 1000 may comprise a radar system 1010 or a phased-array receiver 1020 described above. A vehicle may for example be a car, a ship, a plane, a helicopter, or a satellite. In a car, an automotive radar system may for example be used for tracking safety distance between cars or as a parking assistance system.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in-phase mixing circuit 614 and quadrature mixing circuit 620 may be implemented as a combined IQ mixer.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, mixing circuits 614, 620 and phase rotation circuit 612 may be implemented as circuitry implemented on a single integrated circuit. Alternatively, the examples may be implemented as any number of separate integrated circuits or separate devices interconnected with each other in a suitable manner. For example, each analog beamforming receive channel 602 of a phased-array receiver may be implemented on a separate integrated circuit.

Also for example, the examples, or portions thereof, may be implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A phased-array receiver, comprising:
a plurality of analog beamforming receive channels, each connectable to an antenna element arranged to receive a radio frequency signal and a channel output arranged to provide an analog channel output signal, wherein at least one of said plurality of analog beamforming receive channels comprises:
an in-phase downconversion mixing circuit connected to said antenna element and a local oscillator source and arranged to provide a downconverted in-phase signal to a phase rotation circuit; and
a quadrature downconversion mixing circuit connectable to said antenna element and said local oscillator source and arranged to provide a downconverted quadrature signal to said phase rotation circuit; said phase rotation circuit being arranged to provide to said channel output a phase-shifted analog output signal generated from said downconverted in-phase signal and said downconverted quadrature signal.

2. The phased-array receiver as claimed in claim 1, wherein at least one of said plurality of analog beamforming receive channels comprises a weighting amplifier circuit connected to amplify said phase-shifted analog output signal before provision to said channel output.

3. The phased-array receiver as claimed in claim 1, comprising a first summation circuit connected to said channel outputs of said plurality of analog beamforming receive channels and arranged to provide an analog summation output signal.

4. The phased-array receiver as claimed in claim 3, comprising one analog-digital conversion circuit, said analog-digital conversion circuit connected to receive said analog summation output signal and provide a digital summation output signal.

5. The phased-array receiver as claimed in claim 1, wherein at least one of said plurality of analog beamforming receive channels comprises a power splitter circuit connected between said antenna element and said in-phase downconversion mixing circuit and said quadrature downconversion mixing circuit to split the radio frequency signal into a second radio frequency signal for provision to said in-phase downconversion mixing circuit and a third radio frequency signal for provision to said quadrature downconversion mixing circuit.

6. The phased-array receiver as claimed in claim 1, wherein at least one of said plurality of analog beamforming receive channels comprises one or more high-pass filter circuits arranged to high-pass filter said downconverted in-phase signal and said downconverted quadrature signal before provision to said phase rotation circuit.

7. The phased-array receiver as claimed in claim 1, wherein said in-phase downconversion mixing circuit and said quadrature downconversion mixing circuit are homodyne downconversion mixing circuits.

8. The phased-array receiver as claimed in claim 1, wherein said radio frequency signal is a radar signal.

9. The phased-array receiver as claimed in claim 1, wherein said phase rotation circuit comprises a plurality of controllable variable gain amplification devices, and a second summation circuit; said plurality of controllable variable gain amplification devices being arranged to separately amplify said downconverted in-phase signal and said downconverted quadrature signal depending on parameter values provided by a controller device.

10. The phased-array receiver as claimed in claim 1, wherein at least one of said plurality of analog beamforming receive channels comprises a directional coupler circuit connected to an output of said local oscillator source, and arranged to provide an in-phase local oscillator signal to said in-phase downconversion mixing circuit and a quadrature local oscillator signal to said quadrature downconversion mixing circuit.

11. The phased-array receiver as claimed in claim 10, wherein said directional coupler comprises a branchline coupler.

12. The phased-array receiver as claimed in claim 10, wherein said directional coupler comprises a frequency divider circuit.

13. A radar system, comprising a phased-array receiver as claimed in claim 1.

14. A vehicle, comprising a radar system as claimed in claim 13.

15. The phased-array receiver as claimed in claim 2, comprising a first summation circuit connected to said channel outputs of said plurality of analog beamforming receive channels and arranged to provide an analog summation output signal.

16. The phased-array receiver as claimed in claim 2, wherein at least one of said plurality of analog beamforming receive channels comprises a power splitter circuit connected between said antenna element and said in-phase downconversion mixing circuit and said quadrature downconversion mixing circuit to split the radio frequency signal into a second radio frequency signal for provision to said in-phase downconversion mixing circuit and a third radio frequency signal for provision to said quadrature downconversion mixing circuit.

17. The phased-array receiver as claimed in claim 3, wherein at least one of said plurality of analog beamforming receive channels comprises a power splitter circuit connected between said antenna element and said in-phase downconversion mixing circuit and said quadrature downconversion mixing circuit to split the radio frequency signal into a second radio frequency signal for provision to said in-phase downconversion mixing circuit and a third radio frequency signal for provision to said quadrature downconversion mixing circuit.

18. The phased-array receiver as claimed in claim 2, wherein at least one of said plurality of analog beamforming receive channels comprises one or more high-pass filter circuits arranged to high-pass filter said downconverted in-phase signal and said downconverted quadrature signal before provision to said phase rotation circuit.

19. The phased-array receiver as claimed in claim 3, wherein at least one of said plurality of analog beamforming receive channels comprises one or more high-pass filter circuits arranged to high-pass filter said downconverted in-phase signal and said downconverted quadrature signal before provision to said phase rotation circuit.

20. The phased-array receiver as claimed in claim 2, wherein said in-phase downconversion mixing circuit and said quadrature downconversion mixing circuit are homodyne downconversion mixing circuits.

\* \* \* \* \*